April 30, 1963

R. N. ABILD 3,087,511

SEQUENCE OPERATING VALVE SYSTEM

Filed Aug. 24, 1960

INVENTOR.
Robert N. Abild
BY
Raymond W Colton
ATTORNEY

United States Patent Office 3,087,511
Patented Apr. 30, 1963

3,087,511
SEQUENCE OPERATING VALVE SYSTEM
Robert N. Abild, New Britain, Conn., assignor to United Aircraft Corporation, East Hartford, Conn., a corporation of Delaware
Filed Aug. 24, 1960, Ser. No. 51,736
13 Claims. (Cl. 137—628)

This invention relates to a novel valve structure, and more specifically to a novel sequence operating valve system comprising a series of interconnected valves to open and close in sequence.

While not limited thereto, the present invention finds special application in controlling the flow of propellants to the combustion chamber of a rocket motor. A liquid fuel propellant and a liquid oxidizer propellant are supplied to such rocket motors through separate supply lines, the propellants being mixed and burned in the combustion chamber of the rocket motor to provide the combustion products to be discharged from the reaction nozzle to furnish the propulsive thrust. An example of such a system is disclosed in applicant's copending application Serial No. 56,320, filed on September 15, 1960. Such rocket motors are charged with propellants prior to launching, and it is important, first, that no propellants shall be supplied to the combustion chamber until the device is intended to be launched, and second, that one of the propellants shall be supplied before the other. For this purpose, the propellant supply lines are provided with cut-off valves, which are sequentially actuated to open and close in a given order. Such valves must be positive in operation, and must be constructed to be leakproof as to propellant flow as well as to operating fluid flow.

It is an object of the invention, therefore, to provide a novel sequencing valve system having a series of valves, which includes an operating system that is positive in action and is leakproof.

It is a further object to provide a novel valve that is pressure fluid actuated to a closed or to an open position.

It is a further object to provide a novel sequencing valve system comprising a series of interconnected valves, the valves being pressure fluid actuated to opened and closed positions, the valves having auxiliary valve devices, responsive to the movement of the valve elements, to control the flow of pressure fluid from one valve to the other, the connections being such that there is no flow of pressure fluid between valves until one valve has fully completed its movement to an opened or closed position.

It is a still further object to provide a novel fluid pressure actuated valve having independent expansible chambers for opening and closing movement of the valve element, the chambers being constructed to assure that there will be no leakage of pressure fluid between the expansible chambers, or from the chambers into the valve flow passage.

Other objects and features will become apparent from a consideration of the following description and the attached drawings, in which:

FIG. 3 is a sectional view through one of the valves taken on the line 3—3 of FIG. 1.

Figure 1:
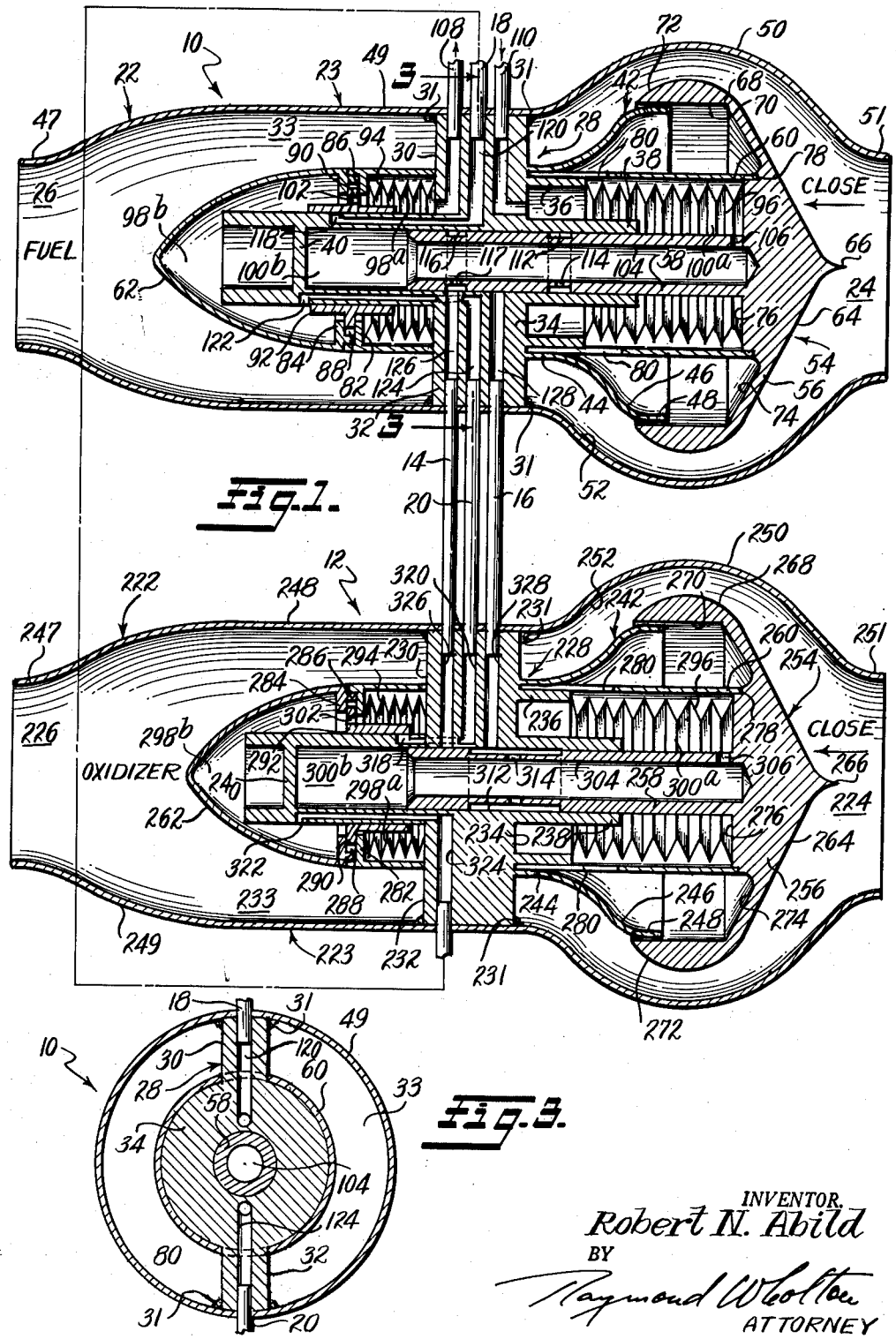
FIG. 1 is a sectional view of a pair of interconnected sequence operating valves in their opened positions.

Referring to the drawings, in which corresponding elements in the several figures are designated by the same reference characters, the numeral 10 indicates a master valve, and the numeral 12 indicates a slave valve, the valves being interconnected for sequential operation by a plurality of pressure fluid connections 14, 16, 18 and 20.

The master valve 10 comprises a housing 22 including a tubular section 23 having an inlet 24 and an outlet 26, and an island 28 supported, in spaced relation to the tubular section 23, by a pair of radially extending, diametrically disposed mounts 30 and 32, which are welded at 31 to the tubular section. The mounts are narrow and streamlined in cross section, to offer a minimum resistance to flow of fluid through the tubular section 23, and support the island centrally of the tubular section to define, between the island 28 and the tubular section, an annular flow passage 33.

The island 28 includes a central partition 34, of circular cross section (FIG. 3) extending transversely thereof, which carries, at its periphery, an annular sleeve 36 extending in an upstream direction. At the mid portion, the partition 34 carries an elongated sleeve 38, annular in cross section, having portions extending in an upstream and in a downstream direction from the partition, and forming a tubular guide element for an auxiliary valve element as described later. A partition 40 extends across the tubular guide element 38 adjacent the downstream end thereof. The mounts 30 and 32 support an annular flow smoothing fairing 42 spaced from and concentric with the annular sleeve 36. The annular fairing 42 extends in an upstream direction, and comprises a cylindrical portion 44 connected with the mounts 30 and 32 for supporting the fairing, an outwardly expanding portion 46, and an outer cylindrical portion 48 of larger diameter than the portion 44.

The tubular section 23 of the housing 22 includes a reduced diameter section 47 at the outlet 26, which is enlarged into a cylindrical section 49 surrounding the island 28, followed by a bulbous section 50 surrounding the valve head, as will be described more particularly hereinafter. The bulbous section merges into an inlet section 51 of smaller cross section. The inner wall of the bulbous section 50, adjacent the cylindrical section 49, includes a valve seat 52 which cooperates with the valve head to cut off flow of fluid through the valve, as will be described later.

A valve member 54 is mounted for movement in the island 28, and includes a valve head 56 upstream of the island, supported by a valve stem 58. The valve member 54 also includes a tubular body 60 in the form of a sleeve, mounted concentric with the valve stem 58, and having a slight clearance with reference to the outer cylindrical sleeve 36. The downstream end of the tubular body 60 is closed by an ogival member 62. The valve member 54, including the head 56, tubular body 60 and closure member 62, provide a structure which completely surrounds the island 28, except at the points of attachment of supports 30 and 32.

Figure 2:
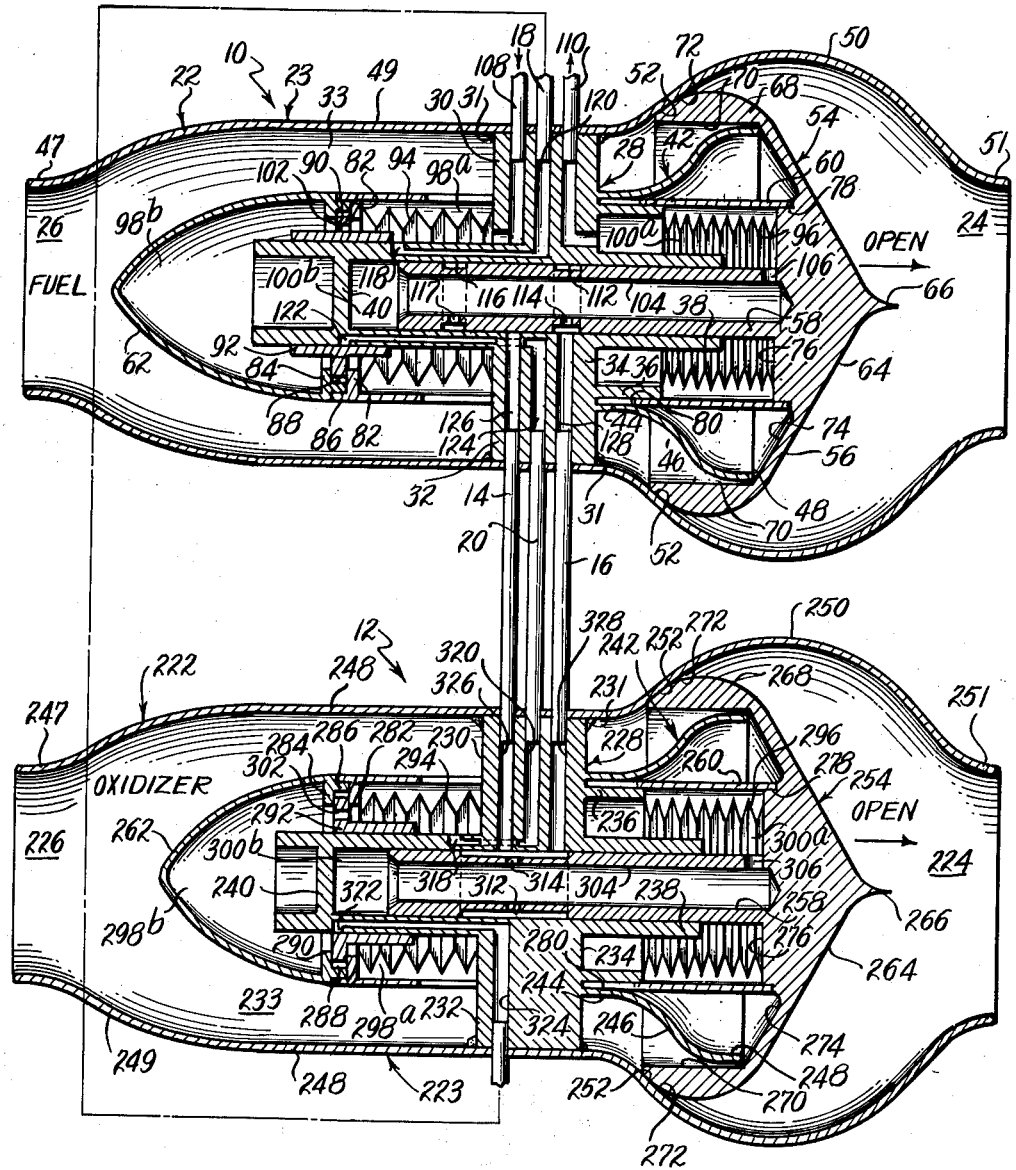
FIG. 2 is a sectional view of the valves in their closed positions.

The valve head 56 is generally umbrella-shaped, including a conical section 64 having a pointed apex 66 directed upstream, and an axial skirt 68 at the base, extending in a downstream direction. The inner wall of the skirt 68 is cylindrical and surrounds, with slight clearance, the outer cylindrical portion 48 of the annular fairing 42, to prevent the trapping of fluid between the valve member 54 and the fairing 42 when the valve member moves to its closed position. The outer wall of the skirt 68 is rounded at 72 and is adapted to contact the valve seat 52 when the valve member 54 is in its closed position as shown in FIG. 2. The skirt 68 is joined by a section having an inner frusto-conical wall 74. The inner part of the valve head, surrounding the valve stem 58, includes a radial wall 76, the walls 74 and 76 being connected by an annular shoulder 78 to which one end of the tubular body 60 is connected, as by welding.

The tubular body 60 includes a pair of axially elongated diametrically disposed, slots 80, through which the mounts 30 and 32 pass. The circumferential portion of the tubular body 60, in the area of the slots 80, slides within the annular gap formed between the outer wall of the outer cylindrical sleeve 36 and the inner wall of the cylindrical portion 44 of the annular fairing 42. The tubular body 60 is also provided with an internal flange 82, spaced a short distance from the downstream end. The upstream end of the ogival closure includes an internal flange 84 which carries an axially extending flange 86 spaced inwardly from the outer periphery of the closure. The flange 86 is adapted to telescopically fit within the downstream end of the tubular body 60 and to be connected thereto, as by welding, thereby forming an internal, annular slot 88 between the spaced internal flanges 82 and 84. The slot 88 slidingly receives the radial flange 90 of a sleeve valve 92 surrounding the downstream portion of the tubular guide element 38, to co-operate with openings therein as will be described more fully hereinafter. A bellows 94 is connected between the downstream face of the partition 34 and the upstream face of the internal flange 82, and a second bellows 96 is connected between the upstream end of the outer cylindrical sleeve 36 and the radial wall 76.

The structure above described defines a first expansible chamber including the sections 98a—98b having a fixed wall comprising the downstream faces of the partitions 34 and 40 and a movable wall comprising the inner wall of the ogival closure 62 and the bellows 94, and a second expansible chamber including the sections 100a—100b having a fixed wall comprising the upstream faces of the partitions 34 and 40 and a movable wall comprising the radial wall 76, the closed end of a bore 104 in the valve stem 58 and the end of the valve stem, and the bellows 96. While the expansible chambers are shown as having bellows forming the movable wall, it should be understood that a cylinder and piston construction could be substituted. One or more openings 102 in the radial flange 90 connect the sections 98a and 98b of the first expansible chamber, and one or more openings 106 through the hollow valve stem 58 to the bore 104 connect the sections 100a and 100b of the second expansible chamber. A first pressure fluid connection 108, through the mount 30 and the downstream face of the partition 34, permits the admission of pressure fluid to the first expansible chamber 98a—98b and the exhaust therefrom, and a second pressure fluid connection 110, through the mount 30 and the upstream face of the partition 34, permits the admission of pressure fluid to the second expansible chamber 100a—100b and the exhaust therefrom. It is evident that the admission of pressure fluid through the connection 108 and the exhaust of pressure fluid through the connection 110 effects movement of the valve member 54 to its closed position, shown in FIG. 2, and the admission of pressure fluid through the connection 110 and discharge of pressure fluid from the connection 108 effects movement of the valve member 54 to its opened position shown in FIG. 1. Suitable valve means in the connections 108 and 110, not shown, may be selectively operated to supply pressure fluid to one of the connections while permitting the discharge of pressure fluid from the other.

Movement of the valve member 54 is utilized to control various auxiliary valve devices to connect the expansible chambers 98a—98b and 100a—100b to other points, such as, for example, to a slave valve in a sequence operating valve system. Such auxiliary valve devices include the sleeve valve 92, described above, and other structure in the nature of an outer annular channel 112 about midway of the length of the valve stem 58, and another outer annular channel 116 adjacent the outer end of the stem. The annular channels 112 and 116 are connected with the bore 104 of the valve stem by the radial apertures 114 and 117, respectively. The peripheral wall of the tubular guide element 38 includes a first opening 118 connected with a passage 120 extending through the wall of the tubular guide element and through the mount 30, and a second opening 122 connected to a passage 124 extending through the wall of the tubular guide element and through the mount 32, the openings 118 and 122 being controlled by the sleeve valve 92. The openings 118 and 122 are axially spaced, and the sleeve valve 92 has a definite axial length so related to the spacing of the openings 118 and 122, and to the extent of movement of the valve element 54 between its fully opened position and its fully closed position, to uncover the opening 122 when the valve element 54 is in its fully opened position as shown in FIG. 1 and to cover it in all other positions, and to uncover the opening 118 when the valve element 54 is in its fully closed position as shown in FIG. 2 and to cover it in all other positions.

The mount 32 includes a pair of spaced passages 126 and 128, the inner ends of which are connected with the interior of the tubular guide element 38 and adapted to register with the annular channels 112 and 116. The spacing of the passages 126 and 128 on the one hand, and the spacing of the annular channels 112 and 116 on the other hand, are such that the annular channel 116 registers with the inner end of the passage 126 only when the valve element 54 is in its fully opened position as shown in FIG. 1 and out of registry in all other positions, and the annular channel 112 is in registry with the inner end of the passage 128 only when the valve element 54 is in its fully closed position as shown in FIG. 2 and is out of registry in all other positions.

The outer end of the passage 120 communicates with the connection 18. Similarly, the outer end of the passage 124 communicates with the connection 20; the outer end of the passage 126 communicates with the connection 14; and the outer end of the passage 128 communicates with the connection 16.

The slave valve 12 is substantially identical with the master valve 10, comprising a housing 222 including a tubular section 223 having a fluid inlet 224 and a fluid outlet 226, and an island 228 concentrically supported within the tubular section 223 by a pair of radially extending, diametrically disposed, mounts 230 and 232 identical in construction with the mounts 30 and 32. The island 228 includes a partition 234 of circular cross section, the periphery of which carries an axially extending sleeve 236 directed upstream and a central, elongated sleeve 238 forming a tubular guide element having axial portions extending upstream and downstream from the partition 234. A partition 240 extends across the tubular guide element 238 adjacent the downstream end thereof. An annular flow smoothing fairing 242, concentric with the sleeve 236, extends upstream from the mounts 230 and 232, being connected with said mounts. The annular fairing 242 includes a cylindrical portion 244 having an internal diameter slightly larger than the external diameter of the cylindrical sleeve 236 and spaced therefrom, an outwardly expanding portion 246, which joins, at its larger upstream end, a cylindrical portion 248 having a small clearance with the skirt of the valve head as will be described more fully hereinafter.

The tubular section 223 of the valve housing 222 comprises a downstream section 247, which expands, by a reverse curved section 249 upstream from the outlet end 226 to merge into a cylindrical section 248 surrounding the island 228 and spaced therefrom to form an annular flow channel 233. The section 248 joins a bulbous section 250 surrounding the head 256 of the valve member 254. The section 250, on its inner wall adjacent the section 248, is provided with a valve seat 252 to cooperate with the head of the valve member 254 to close the flow of fluid through the valve, as described later.

The valve member 254 is supported for axial sliding movement by the island 228, the valve member comprising the valve head 256 of generally umbrella-form, a central, axially extending valve stem 258 telescopically fitting within the tubular guide element 238, and an axially extending tubular body 260 telescopically fitting around the partition 234. The downstream end of the tubular body 260 is connected with an ogival closure member 262.

The valve head 256, tubular body 260, and closure member 262 completely enclose the island 228, except at the attachment points of supports 230 and 232.

The valve head 256 includes a conical upstream surface 264 having a pointed upstream apex 266 at the center of the inlet 224. The base of the valve head carries an axially extending, downstream directed, skirt 268 having an inner cylindrical wall 270 and an outer rounded wall 272 adapted to engage the valve seat 252, as shown in FIG. 2, to prevent flow of fluid through the valve 12. The downstream surface of the valve head 256 includes a frusto-conical wall 274 and a radial wall 276, the walls 274 and 276 being joined by an annular shoulder 278 to which the upstream end of the tubular body 260 is attached, as by welding.

The midsection of the tubular body 260 is provided with a pair of diametrically disposed, axially extending, slots 280, through which the mounts 230 and 232 pass. An area of the tubular body 260 in the vicinity of the slots 280 moves within the annular gap formed by the outer surface of the concentric cylindrical sleeve 236 and the inner surface of the cylindrical portion 244 of the annular sleeve 242.

The downstream end of the tubular body 260 carries an internal flange 282 spaced from the end thereof, and the upstream, open end of the ogival closure member 262 carries an internal flange 284. The internal flange 284 is provided with an axially extending flange 286 adapted to telescopically fit within the downstream end of the tubular body 260, and serving to connect the tubular body 260 and the ogival closure member 262 together. When so connected, the internal flanges 282 and 284 are spaced apart to form an internal annular recess or slot 288 to slidingly receive the radial flange 290 of a sleeve valve 292 surrounding the downstream section of the tubular guide element 238.

The ends of a bellows 294 are secured to the downstream face of the partition 234 and the upstream face of the internal flange 282, and the ends of a second bellows 296 are secured to the upstream end of the cylindrical sleeve 236 and the radial wall 276.

The structure described above defines a pair of expansible chambers effective to move the valve member 254 to its opened and closed position as shown in FIGS. 1 and 2, respectively. The downstream faces of the partitions 234 and 240 comprise the abutment wall, while the bellows 294 and the inner wall of the ogival closure member 262 comprise the movable wall of a first expansible chamber having the sections $298^a$—$298^b$ connected by one or more apertures 302 in the radial flange 290. The upstream faces of the partitions 234 and 240 comprise an abutment wall, while the bellows 296, the radial wall 276, the inner end of the bore 304 in the valve stem 258 and the end of the valve stem 258 comprise the movable wall of a second expansible chamber having the sections $300^a$—$300^b$ connected by one of more apertures 306 through the wall of the hollow valve stem 258.

The movable valve member 254 and the tubular guide element 238 include a number of auxiliary valve devices, as follows: the outer wall of the downstream extension of the tubular guide element 238 is provided with a pair of axially and circumferentially spaced openings or outlets 318 and 322, which are connected with the passages 320 and 324, respectively. The passage 320 extends through the mount 230, being connected, at its outer end, to the connection 20, while the passage 324 extends through the mount 232 and is connected, at its outer end, with the connection 18. The valve stem 258 also includes an external annular channel 312, having a substantial axial length, which is connected to the interior bore 304 of the valve stem by one or more radial apertures 314.

The flow of pressure fluid through the axially spaced openings 318 and 322 is under the control of the sleeve valve 292, carried by and movable with the valve member 254. The axial spacing of the openings 318 and 322 is so designed, and the axial length of the sleeve valve 292 is so chosen, with reference to the axial movement of the valve member 254 between its extreme positions marking its opened and its closed positions, that the opening 318 is covered only when the valve member 254 is in its fully opened position as shown in FIG. 1 and is uncovered in all other positions, and the opening 322 is covered only when the valve member 254 is in its fully closed position shown in FIG. 2 and is uncovered in all other positions.

The annular channel 312 cooperates with a pair of spaced passages 326 and 328 passing through the mount 230, the inner ends of the passages terminating in the interior of the tubular guide element 238 and the outer ends of the passages being connected with the connections 14 and 16, respectively. The axial spacing of the passages 326 and 328, and the axial extent of the annular channel 312, are so related to the axial movement of the valve member 254 between its fully opened and closed positions that the annular channel 312 registers only with the passage 328 when the valve member is in its fully opened position as shown in FIG. 1, and registers with both passages 326 and 328 when the valve member occupies its fully closed position as shown in FIG. 2.

The inner wall of the tubular section 23 of the housing 22 on the one hand, and the outer wall of the valve member 54 and the annular fairing 42 on the other hand, provide a smooth flow passage 33 through the master valve 10, free from any sharp corners or abrupt turns that might cause turbulence. Similarly, the inner wall of the tubular section 223 of the housing 222 on the one hand, and the outer wall of the valve member 254 and the annular fairing 242 on the other hand, provide a smooth flow passage 233 through the slave valve 12.

The operation is as follows: FIG. 1 shows the master valve 10 and the slave valve 12 in their fully opened position. The valve 10 may be the fuel supply valve and the valve 12 may be the oxidizer supply valve to a rocket motor. The pressure fluid connection 110 communicates with a source of fluid under pressure, such as, for example, helium, and the pressure fluid connection 108 communicates with a point of low pressure as, for example, the ambient atmosphere. Fluid under pressure is effective in the expansible chamber $100^a$—$100^b$ to move and to retain the valve member 54 in its extreme right-hand position shown, movement being limited by the engagement of the downstream ends of the slots 80 with the downstream ends of the mounts 30 and 32. Fluid under pressure from the expansible chamber $100^a$—$100^b$ passes through aperture 106, bore 104, aperture 117 and annular channel 116, passage 126, connection 14, and passage 326 where it is blocked by the solid portion of the valve stem 258 of the slave valve 12. In the open position of the valve member 254 shown in FIG. 1, the pressure fluid in the expansible chamber $300^a$—$300^b$ is trapped, and cannot escape by the aperture 314, annular channel 312, passage 328, connection 16 and passage 128 because the inner end of the passage 128 is blocked by the solid portion of the valve stem 58 as shown. The trapped fluid is under sufficient pressure to maintain the valve member 254 in its fully opened position against the pressure of the fluid flowing in the inlet 224. At the same time, the pressure of the fluid in the expansible chamber $100^a$—$100^b$ is sufficient to maintain the valve member 54 fully opened against the pressure of the fluid in the inlet 24. Should the valve member 254, by any reason, move toward its closed position, the annular channel 312 will register with the passage 326, permitting the admission of high pressure fluid from expansible chamber $100^a$—$100^b$ to restore the valve member 254 to its fully opened position.

At this time, the expansible chamber $98^a$—$98^b$ is connected to a point of low pressure through the fluid connection 108, and there is no fluid pressure in this chamber tending to move the valve element 54 to its closed position. Pressure fluid has escaped from the corresponding expansible chamber 298ᵃ—298ᵇ in the slave valve, and the passages and connections between the two expansible chambers 98ᵃ—98ᵇ and 298ᵃ—298ᵇ are closed by the sleeve valves 92 and 292 as shown in FIG. 1. It should be observed, therefore, that when both valves 10 and 12 are in their fully opened position, shown in FIG. 1, both expansible chambers in the slave valve 12 are cut off from communication with the corresponding expansible chambers in the master valve 10.

When it is desired to close both valves, the pressure fluid connection 108 is placed in communication with a source of fluid under pressure, and the pressure fluid connection 110 is placed in communication with a point of low pressure, such as the ambient atmosphere. Fluid under pressure from the connection 108 acts in the expansible chamber 98ᵃ—98ᵇ to move the valve member 54 toward the left, while the fluid in the expansible chamber 100ᵃ—100ᵇ escapes by way of the connection 110. After the initial closing movement of the valve member 54, the opening 122 is covered, and the annular channel 116 moves out of registry with the passage 126. During this movement of the valve member 54, the fluid in the expansible chambers of the valve 12 is trapped, and consequently no movement of the valve member 254 takes place until the valve member 54 reaches its fully closed position shown in FIG. 2. In this position of the valve member 54, the opening 118 is uncovered by the sleeve valve 92, and the annular channel 112 moves into registry with the passage 128. Fluid under pressure from the expansible chamber 98ᵃ—98ᵇ passes through the opening 118, passage 120, connection 18, passage 324 and opening 322, as shown in FIG. 1, into the expansible chamber 298ᵃ—298ᵇ, moving the valve member 254 toward the left or its closed position, while pressure fluid escapes from the expansible chamber 300ᵃ—300ᵇ by aperture 314, annular channel 312, passage 328, connection 16, passage 128, annular channel 112, aperture 114 through the expansible chamber 100ᵃ—100ᵇ and fluid connection 110. The valve member 254 continues to move to its full closed position, shown in FIG. 2, at which point the sleeve valve 292 covers the opening 322, trapping the pressure fluid within the expansible chamber 298ᵃ—298ᵇ while the annular channel 312 continues to remain in registry with the passage 328 and the expansible chamber 100ᵃ—100ᵇ and the point of low pressure by way of the connection 110. It may be seen, therefore, that the expansible chambers 100ᵃ—100ᵇ and 300ᵃ—300ᵇ remain connected to the point of low pressure, and there cannot be a build up of pressure in case of leakage into these chambers and a consequent accidental opening of the valves. It should be noted, with reference to FIG. 2, that the annular channel 312 is also in registry with the passage 326, connection 14 and passage 126, but that the inner end of the passage 126 is blocked by the valve stem 58.

When it is desired to open both valves, the connection 110 is placed in communication with the source of high pressure helium, or other high pressure fluid, and the connection 108 is placed in communication with a point of low pressure, such as the ambient atmosphere. Fluid under pressure enters the expansible chamber 100ᵃ—100ᵇ by the connection 110, and moves the valve member 54 toward the right or open position, while the fluid in the expansible chamber 98ᵃ—98ᵇ escapes to the point of low pressure through the connection 108. Upon the initial movement of the valve member 54 toward the right, the valve sleeve 92 covers the opening 118, and the annular channel 112 moves out of registry with the passage 128. The fluid is now trapped in both expansible chambers 298ᵃ—298ᵇ and 300ᵃ—300ᵇ of the valve 12, assuring that no movement thereof can occur. When the valve member 54 reaches its fully opened position shown in FIG. 1, determined when the downstream ends of the slots 80 engage the downstream ends of the mounts 30 and 32, the sleeve valve 92 uncovers the opening 122, and the annular channel 116 comes into registry with the passage 126, as shown in FIG. 1. Fluid under pressure from the expansible chamber 100ᵃ—100ᵇ passes by way of aperture 117, annular channel 116, passage 126, connection 14, passage 326, channel 312 and aperture 314 into the expansible chamber 300ᵃ—300ᵇ, wherein it is effective to move the valve member 254 to the right or opened position shown in FIG. 1. During such movement toward the opened position, the pressure fluid from the expansible chamber 298ᵃ—298ᵇ escapes by opening 318, passage 320, connection 20, passage 124, opening 122 and through the expansible chamber 98ᵃ—98ᵇ and connection 108 to the point of low pressure. As the valve member 254 starts to move to its opened position, the sleeve valve 292 uncovers the opening 322, but the other end of this pressure line is closed by the sleeve valve 92 as shown in FIG. 1. The valve member 254 continues its opening movement until stopped by engagement of the downstream ends of the slots 280 with the downstream ends of the mounts 230 and 232. In this position, as seen in FIG. 1, the sleeve valve 292 has covered the opening 318, and the annular channel 312 has moved out of registry with the passage 326, but remains in registry with the passage 328, the other end of which is blocked by the valve stem 58.

It may be observed from the foregoing, therefore, that no movement of the slave valve, either toward its opening or closing position, is possible until the master valve has fully completed its opening or closing movement, and that when both valves are fully opened, the fluid is trapped in both expansible chambers of the slave valve. It should also be observed that, when both valves are fully closed, the expansible chamber of the slave valve which is effective to move the valve member therein to its opened position remains in communication with the point of low pressure through the corresponding expansible chamber in the master valve, and that the fluid in that expansible chamber in the slave valve which is effective to move the valve member therein toward its closed position is trapped therein.

Having fully disclosed my invention, it will be understood that various changes may be made in the details of the construction and in the arrangement of the parts of the valve system disclosed herein without departing from the principles of the invention and the scope of the annexed claims.

I claim:

1. A sequencing valve system, comprising: a master valve, said valve including a housing defining a flow passage, a valve member mounted for movement in said housing to control the flow of fluid through said passage, said housing and said valve member including cooperating elements to define a pair of independent expansible chambers, a pressure fluid line connected with each chamber to admit fluid to one chamber and to discharge fluid from the other chamber to move the valve member in one direction, and vice versa; a slave valve including a housing defining a flow passage, a valve member mounted for movement in said latter housing to control the flow of fluid through said latter passage; said latter housing and said latter valve member including cooperating elements to define a pair of independent expansible chambers; the expansible chambers of said master valve and said slave valve including auxiliary valve devices operable between opened and closed positions by movement of the valve members in the respective valves; and connecting means between the auxiliary valve devices of the master valve and slave valve, whereby the completion of a movement to closed position of the master valve member effects a fluid connection between the expansible chambers of the respective valves to move the valve member in the slave valve to its closed position, and the completion of a movement to open position of the master valve member effects a fluid connection between the expansible chambers of the respective valves to move the valve member in the slave valve to its opened position.

2. A sequencing valve system as defined in claim 1, in which the auxiliary valve devices are effective to trap pressure fluid in both expansible chambers in the slave valve when both valves are fully opened, and to trap pressure fluid in that expansible chamber in the slave valve which closes said valve while permitting a fluid connection between that expansible chamber in the slave valve which opens said valve and the corresponding expansible chamber in the master valve when both valves are fully closed.

3. A sequencing valve system as defined in claim 1, in which the valve housing for the master valve includes a tubular member having a bulbous portion and an island, supported by the tubular member, defining said flow passage, said master valve member including a head movable in said bulbous portion and engaging the tubular member in closed position.

4. A sequencing valve system as defined in claim 1, in which the valve housing for the slave valve includes a tubular member having a bulbous portion, and an island, supported by the tubular member, defining said flow passage, said slave valve member including a head movable in said bulbous portion and engaging the tubular member in closed position.

5. A sequencing valve system as defined in claim 1, in which each of said valve housings includes a tubular member having a bulbous portion, and an island, supported by the tubular member, defining said flow passages, each valve member including a head movable in said bulbous portion engaging the tubular member in closed position.

6. A sequencing valve as defined in claim 1, in which each of said valve housings includes a tubular member and an island, supported by the tubular member, defining said flow passages, each island including a wall forming a partition between the independent expansible chambers.

7. A sequencing valve as defined in claim 1, in which each of said valve housings includes a tubular member and an island, supported by the tubular member, defining said flow passages, each island including a guide element; and each valve element having a stem cooperable with said guide element, for axial movement of said valve in said tubular member.

8. A sequencing valve as defined in claim 1, in which each of said valve housings includes a tubular member and an island supported by the tubular member in spaced relation thereto, each valve member including a head and a hollow tubular body surrounding the respective island and said expansible chambers, each tubular body being spaced from the respective tubular member to define said flow passage through the valve, each valve member and each island also including cooperating elements axially guiding said valve member in the respective tubular member.

9. A sequencing valve as defined in claim 1, in which each of said valve housings includes a tubular member and an island supported by the tubular member in spaced relation thereto, each valve member including a head and a hollow tubular body surrounding the respective island and said expansible chambers, each tubular body being spaced from the respective tubular member to define said flow passage through the valve, each island including a tubular guide element, and each valve member including a valve stem slidably mounted in the respective tubular guide element for axially guiding the valve member in the respective tubular member.

10. A sequencing valve as defined in claim 1, in which each of said valve housings includes a tubular member and an island supported by the tubular member in spaced relation thereto, each valve member including a head and a tubular body surrounding the respective island and said expansible chambers, each tubular body being spaced from the respective tubular member to define said flow passage through the valve, each island including a tubular guide element, each valve element including a valve stem mounted for sliding movement relative to the respective guide element for axially guiding the valve member in the respective tubular member, said valve stem and guide element carrying said auxiliary valve devices.

11. A sequencing valve as defined in claim 1, in which each of said valve housings includes a tubular member and an island supported by the tubular member in spaced relation thereto, each valve member including a head and a tubular body surrounding the respective island and said expansible chambers, each tubular body being spaced from the respective tubular member to define said flow passage through the valve, each island including a tubular guide element, each valve element including a valve stem mounted for slidable movement relative to the respective guide element for axially guiding the valve member in the respective tubular member, said auxiliary valve devices being carried by said tubular body and said guide element.

12. A sequencing valve as defined in claim 1, in which each of said valve housings includes a tubular member and an island supported by the tubular member in spaced relation thereto, each valve member including a head and a tubular body surrounding the respective island and said expansible chambers, each tubular body being spaced from the respective tubular member to define said flow passage through the valve, each island including a tubular guide element, each valve element including a valve stem mounted for sliding movement relative to the respective guide element for axially guiding the valve member in the respective tubular member, said auxiliary valve devices being carried by the valve stem and the guide element, and by the tubular body and the guide element.

13. A sequencing valve as defined in claim 1, in which each of said valve housings includes a tubular member and an island supported by the tubular member in spaced relation thereto; each valve member including a head and a tubular body surrounding the respective island and said expansible chambers, each tubular body being spaced from the respective tubular member to define said flow passage through the valve, each island including a tubular guide element, each valve element including a hollow valve stem mounted for sliding movement within the respective guide element for axially guiding the valve member in the respective tubular member, certain of said auxiliary valve devices controlling fluid flow between certain corresponding expansible chambers in the master and slave valves being carried by the respective valve stem and the guide element, and other of said auxiliary valve devices controlling fluid flow between the other corresponding expansible chambers in the master and slave valves being carried by the respective tubular body and the guide element.

References Cited in the file of this patent

UNITED STATES PATENTS

| | | |
|---|---|---|
| 1,483,991 | Slattery | Feb. 19, 1924 |
| 2,569,014 | Martin | Sept. 25, 1951 |
| 2,891,577 | Stewart | June 23, 1959 |
| 2,950,732 | Lambert | Aug. 30, 1960 |